(12) United States Patent
Lerro et al.

(10) Patent No.: US 7,853,580 B2
(45) Date of Patent: Dec. 14, 2010

(54) METHOD, SYSTEM AND COMPUTER PROGRAM FOR DOWNLOADING INFORMATION BASED ON A SNAPSHOT APPROACH

(75) Inventors: Marco Lerro, Rome (IT); Claudio Marinelli, Aprilia (IT)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/931,148

(22) Filed: Oct. 31, 2007

(65) Prior Publication Data

US 2008/0133542 A1 Jun. 5, 2008

(51) Int. Cl.
*G06F 17/30* (2006.01)
(52) U.S. Cl. ...................... 707/706; 707/770
(58) Field of Classification Search .............. 707/706, 707/770
See application file for complete search history.

(56) References Cited

U.S. PATENT DOCUMENTS

| | | | |
|---|---|---|---|
| 5,559,984 A | | 9/1996 | Nakano et al. |
| 6,370,543 B2 * | | 4/2002 | Hoffert et al. ............... 725/113 |
| 6,505,186 B1 * | | 1/2003 | Muro et al. ................. 707/770 |
| 6,601,057 B1 * | | 7/2003 | Underwood et al. ........ 715/207 |
| 6,643,641 B1 * | | 11/2003 | Snyder ....................... 707/709 |
| 6,643,661 B2 * | | 11/2003 | Polizzi et al. ............... 707/709 |
| 6,782,383 B2 * | | 8/2004 | Subramaniam et al. ..... 707/706 |
| 6,789,076 B1 * | | 9/2004 | Dutta ......................... 707/765 |
| 6,836,774 B2 * | | 12/2004 | Melbin ....................... 709/217 |
| 6,865,568 B2 * | | 3/2005 | Chau .......................... 707/706 |
| 6,871,200 B2 * | | 3/2005 | MacQueen et al. .......... 707/770 |
| 6,950,821 B2 * | | 9/2005 | Faybishenko et al. ........ 707/688 |
| 7,103,594 B1 * | | 9/2006 | Wolfe ......................... 707/706 |
| 2002/0083118 A1 * | | 6/2002 | Sim ............................ 709/105 |
| 2002/0198993 A1 | | 12/2002 | Cudd et al. |
| 2004/0267712 A1 | | 12/2004 | Papanyan et al. |
| 2008/0016196 A1 * | | 1/2008 | MacMillan et al. ......... 709/223 |
| 2008/0031428 A1 * | | 2/2008 | Bettis et al. .............. 379/88.16 |
| 2008/0104170 A1 * | | 5/2008 | Ananthanarayanan ....... 709/204 |

* cited by examiner

*Primary Examiner*—Don Wong
*Assistant Examiner*—Kim T Nguyen
(74) *Attorney, Agent, or Firm*—Garg Law Firm, PLLC; Rakesh Garg; Jeffrey S. LaBaw

(57) ABSTRACT

A solution is proposed for reducing the response time of a long query submitted by a client (110) to a server (105)—storing a corresponding database (205). For this purpose, when the server receives the query from the client it starts collecting the result of the query into a table (210), wherein the corresponding selected records are directly accessible at page level (to the contrary of the database). As soon as a first page (Pg1) of the selected records is available in the table, the page is transmitted to the client for its display. Meanwhile, in a completely asynchronous manner, the server continues populating the table. Later on, the user of the client submits a browsing command to the server for moving to a different page (Pgk). In response thereto, the server extracts this page from the table (as soon as available) and returns it to the client directly.

15 Claims, 5 Drawing Sheets

METHOD, SYSTEM AND COMPUTER PROGRAM FOR DOWNLOADING INFORMATION BASED ON A SNAPSHOT APPROACH

FIELD OF THE INVENTION

The present invention relates to the information technology field. More specifically, the invention relates to the downloading of information in a data processing system.

BACKGROUND ART

Downloading of information is a commonplace activity in data processing systems with distributed architecture. In this context, different server computers (or simply servers) manage shared information. This information can be accessed by a great number of users by means of their own client computers (or simply clients), which are connected to the servers in a network; for this purpose, the information selected by each user must be transferred from the relevant server to his/her client. A typical example is the Internet, wherein many servers control large databases; in this case, each client may submit a query to a server for retrieving records of a specific database—suitably filtered and sorted.

However, the time required to download the selected information (from the server to the client through the network) may be a problem in an interactive application—wherein the selected information must be displayed on a monitor of the client in real time; indeed, this substantially increases the response time of the application (from the submission of a request to the availability of the corresponding result), with a deleterious effect on its usability.

The problem is particular acute when a large amount of information must be downloaded from the server to the client (such as in the case of a long query executed on a large database). Moreover, the problem is exacerbated when the server is far away from the client and/or a relatively slow connection is available between them (as it often occurs in the Internet).

Page-based navigation techniques have been proposed to mitigate the above-mentioned drawbacks. In this case, the selected information is logically partitioned into blocks—each one consisting of the amount of information that fits a page being displayed on the monitor of the client. In this way, a first page is provided to the user as soon as it is received from the server (without waiting for the complete downloading of the selected information); later on, the user may move to next pages immediately (if they are already available).

However, when the user needs to display one of the last pages of the selected information, s/he must again wait for the complete downloading thereof; therefore, the same high response time pointed out above is still experienced.

In this context, caching techniques are also commonly used to improve the speed of the process and to reduce network traffic. A cache memory (or simply cache) is a structure that stores information temporarily (consisting of information being previously requested and/or pre-fetched); in this way, when the information required by the user is already available in the cache, it can be provided directly without any downloading from the server.

Typically, a cache is implemented on the client itself. Moreover, another cache may be provided on a proxy server—or a hierarchy of multiple proxy servers which is associated with a group of clients (for example, in a local network for accessing the Internet). The proxy server receives any request from the associated clients; the proxy server returns the corresponding result to the client when it is available in its cache, whereas it forwards the request to the server on behalf of the client otherwise. Naturally, in any case the cache must be very close to the client; indeed, the cache offers advantages only when the time required to retrieve the desired information from it is far lower than the one required to download the same information from the server—i.e., when the cache is available on the client itself or at most on the proxy server being local thereto (on the contrary of the remote server).

Nevertheless, the caching techniques are not completely satisfactory. Particularly, the whole selected information must be always downloaded to the client (or to the proxy server) before the user can access any part thereof; therefore, in this case as well when the user needs to display a part of the selected information close to its end s/he again must wait for the complete downloading thereof. Moreover, when the selected information is very large it is possible that it cannot be saved completely in the cache (typically having a reduced size); anyway, it is likely that most parts of the selected information will be evicted from the cache very fast (for storing further information). Therefore, if the user again requests a part of the selected information that is not available in the cache its whole downloading must be repeated.

SUMMARY OF THE INVENTION

The present invention provides a solution for downloading information in a data processing system. A downloading request from a client entity of the system is received for downloading selected information including a plurality of logic blocks from a source structure, wherein the blocks are not directly accessible to the client entity. The selected information is collected from the source structure into an auxiliary structure wherein the blocks are directly accessible. A transfer speed for collecting the selected information from the source structure into the auxiliary structure is higher than a transfer speed for downloading the selected information from the auxiliary structure to the client entity. A selected one of the blocks is downloaded from the auxiliary structure to the client entity. A browsing command is received from the client entity for accessing a further selected one of the blocks. The further selected block is downloaded from the auxiliary structure to the client entity.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
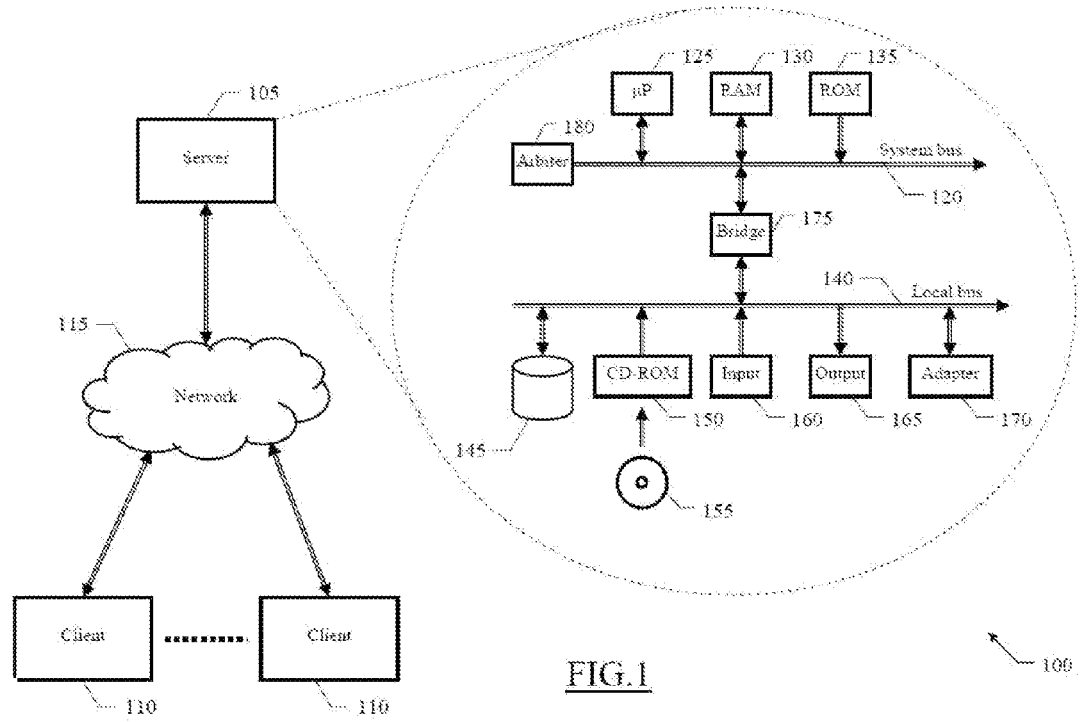
FIG. 1 is a schematic block diagram of a data processing system in which the solution according to an embodiment of the invention is applicable.

With reference in particular to FIG. 1, a distributed data processing system 100 is illustrated. The system 100 has a client/server architecture, wherein servers 105 (only one shown in the figure) manage shared information (such as large databases). Users of multiple clients 110 download selected information from the server 105 (for example, consisting of the result of a query on a specific database). For this purpose, the server 105 and the clients 110 communicate through a network 115 (such as the Internet); typically, the network 115 is implemented by means of telecommunication channels (for example, telephone cables), which allow each client 110 to access the (remote) server 105.

Particularly, the server 105 consists of a computer being formed by several units that are connected in parallel to a system bus 120. In detail, one or more microprocessors (µP) 125 control operation of the server 105; a RAM 130 is directly used as a working memory by the microprocessors 125, and a ROM 135 stores basic code for a bootstrap of the server 105. Several peripheral units are clustered around a local bus 140 (by means of respective interfaces). Particularly, a mass memory consists of one or more hard-disks 145 and drives 150 for reading CD-ROMs 155. Moreover, the server 105 includes input units 160 (for example, a keyboard and a mouse), and output units 165 (for example, a monitor and a printer). An adapter 170 is used to connect the server 105 to the network 115. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

Figure 2A:
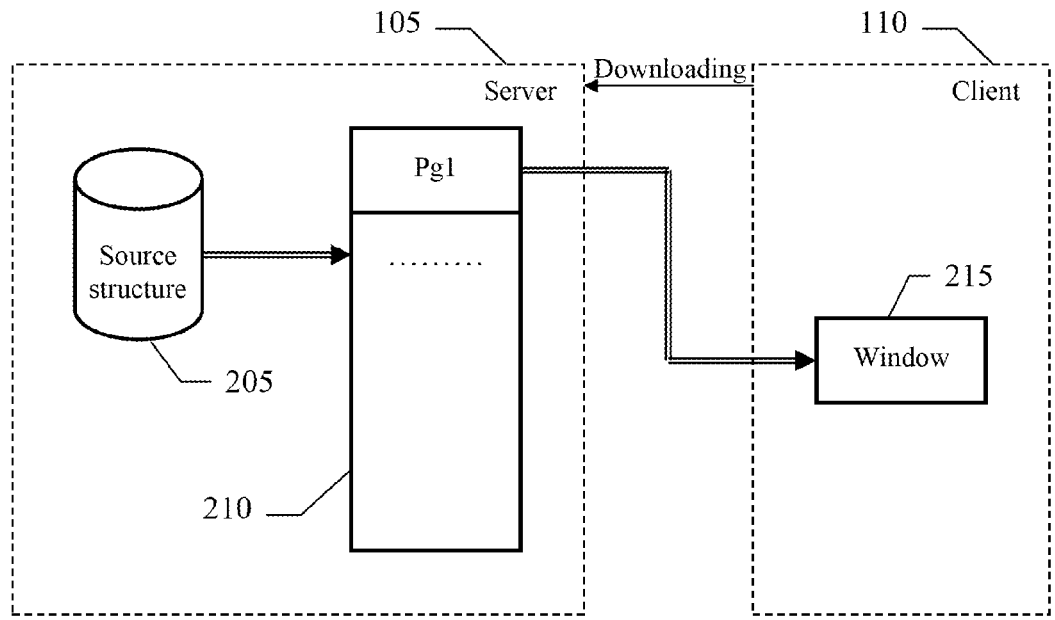
FIGS. 2a-2c illustrate an exemplary application of the solution according to an embodiment of the invention.

With reference now to FIG. 2a, whenever the user of a generic client 110 needs to download selected information from the server 105, s/he submits a corresponding request to the server 105; for example, the request consists of a query for selecting desired records of a database (with the specification of filtering conditions and ordering criteria).

The information is available on the server 105 in a corresponding source structure 205 (the database in the example at issue). However, the source structure 205 does not allow accessing parts of the selected information directly (such as the records of the database matching the filtering conditions of the query); in other words, it is not possible to browse through the selected information in the source structure 205. Therefore, when a specific part of the selected information is desired, it is always necessary to extract the selected information from the source structure 205 in succession until the desired part thereof is reached.

In the solution according to an embodiment of the invention, as described in detail in the following, when the server 105 receives the request from the client 110 it starts collecting the selected information into an auxiliary structure 210 (by running the query in the example at issue); this means copying the selected information as it is extracted from the source structure 205 into the auxiliary structure 210—such as in consecutive lines thereof (for example, at the level of records). The auxiliary structure 210 now allows accessing specific parts of the selected information directly (i.e., records of the result of the query); therefore, it is possible to browse through the selected information in the auxiliary structure 210.

Preferably, the selected information collected in the auxiliary structure 210 is logically organized into pages; each page consists of a block of information, which fits a physical page to be displayed in a window 215 on the monitor of the client 110. As soon as a first page (denoted with Pg1) is completed, this page Pg1 is transmitted from the auxiliary structure 210 to the client 110.

Figure 2B:
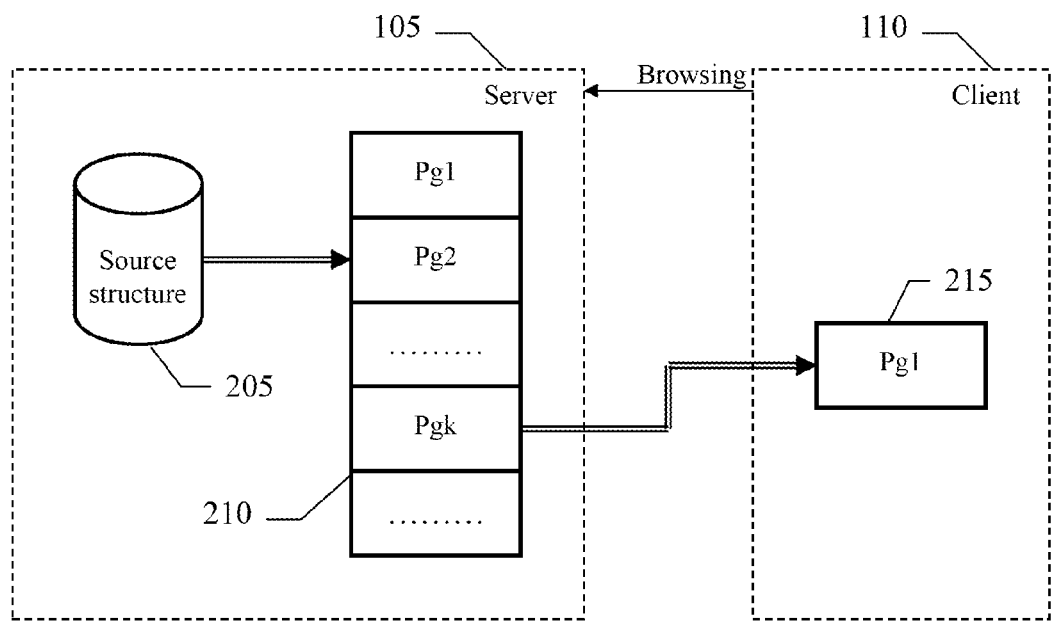

Moving to FIG. 2b, when the page Pg1 is received by the client 110 it is displayed in the window 215. Meanwhile, in a completely asynchronous manner, the server 105 continues collecting the selected information from the source structure 205 into the auxiliary structure 210, until the whole selected information has been copied (so as to obtain next pages thereof denoted with Pg2, . . . , Pgk, . . . ).

Later on, the user may need to move to a different page (such as the page Pgk); for this purpose, s/he submits a corresponding browsing command to the server 105 (with the indication of the desired page Pgk).

Figure 2C:
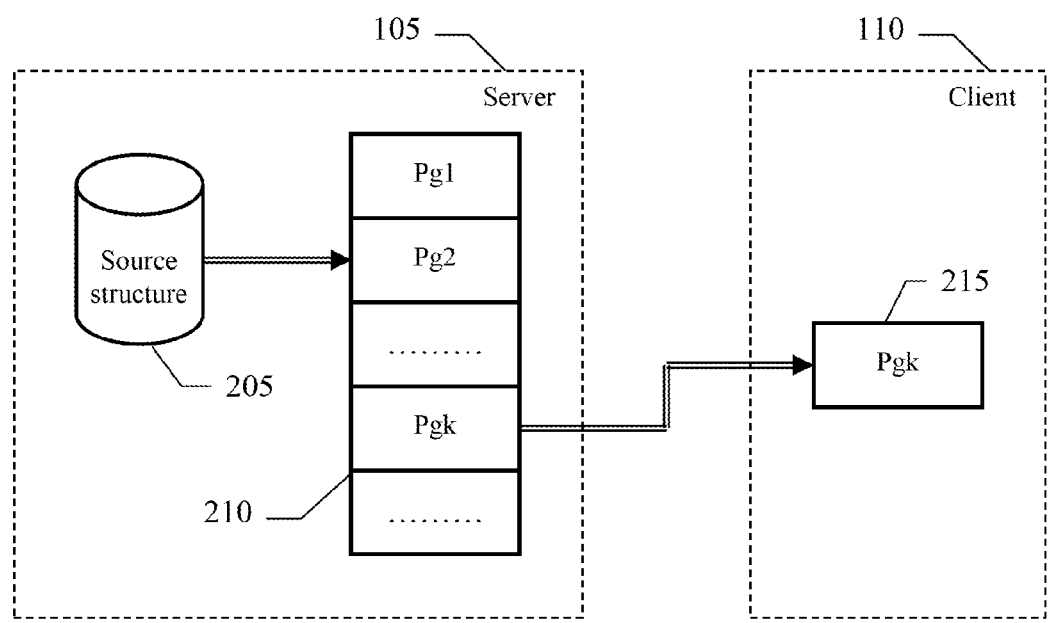

In response thereto, as shown in FIG. 2c, the server 105 immediately extracts the page Pgk (if already available) from the auxiliary structure 210 and transmits it to the client 110. The page Pgk is displayed in the window 215 (replacing the previous page Pg1) as soon as it is received by the client 110. The same operations described above are reiterated for accessing any other page of the selected information.

In this way, it is possible to create a snapshot of the selected information in a relatively fast way—since the auxiliary structure 210 is stored on the server 105 as the source structure 205 is; therefore, this operation does not suffer of the low transfer speed from the server 105 to the client 110 (such as when the server 105 is far away from the client 110 and/or a relatively slow connection is available between them). This snapshot may then be used to browse the selected information directly.

As a result, the client 110 can download any desired page from the auxiliary structure 210. The operation is now relatively fast, since it only requires the transmission of a single page from the server 105 (with the time required to have the desired page available in the auxiliary structure 210 that can be deemed negligible). This strongly reduces the response time of the client 110; moreover, the response time is now substantially uniform and independent of the position of the page in the selected information (disregarding the time required to collect the selected information from the source structure 205 into the auxiliary structure 210).

The proposed solution completely de-couples the collection of the information in a direct-access form (from the source structure 205 to the auxiliary structure 210) from its browsing (by the user of the client 110). For example, it is also possible to avoid transmitting the whole selected information to the client 110 (with a beneficial effect on the network traffic); particularly, in this case only the pages actually requested by the user are transmitted to the client 110. Of course, standard caching techniques may be advantageously exploited to store the pages already downloaded on the client 110 (or on proxy servers) temporarily—so as to provide the cached pages directly when they are required again. However, in this case the amount of information to be stored in the cache is reduced and thus its persistence is increased.

Figure 3:
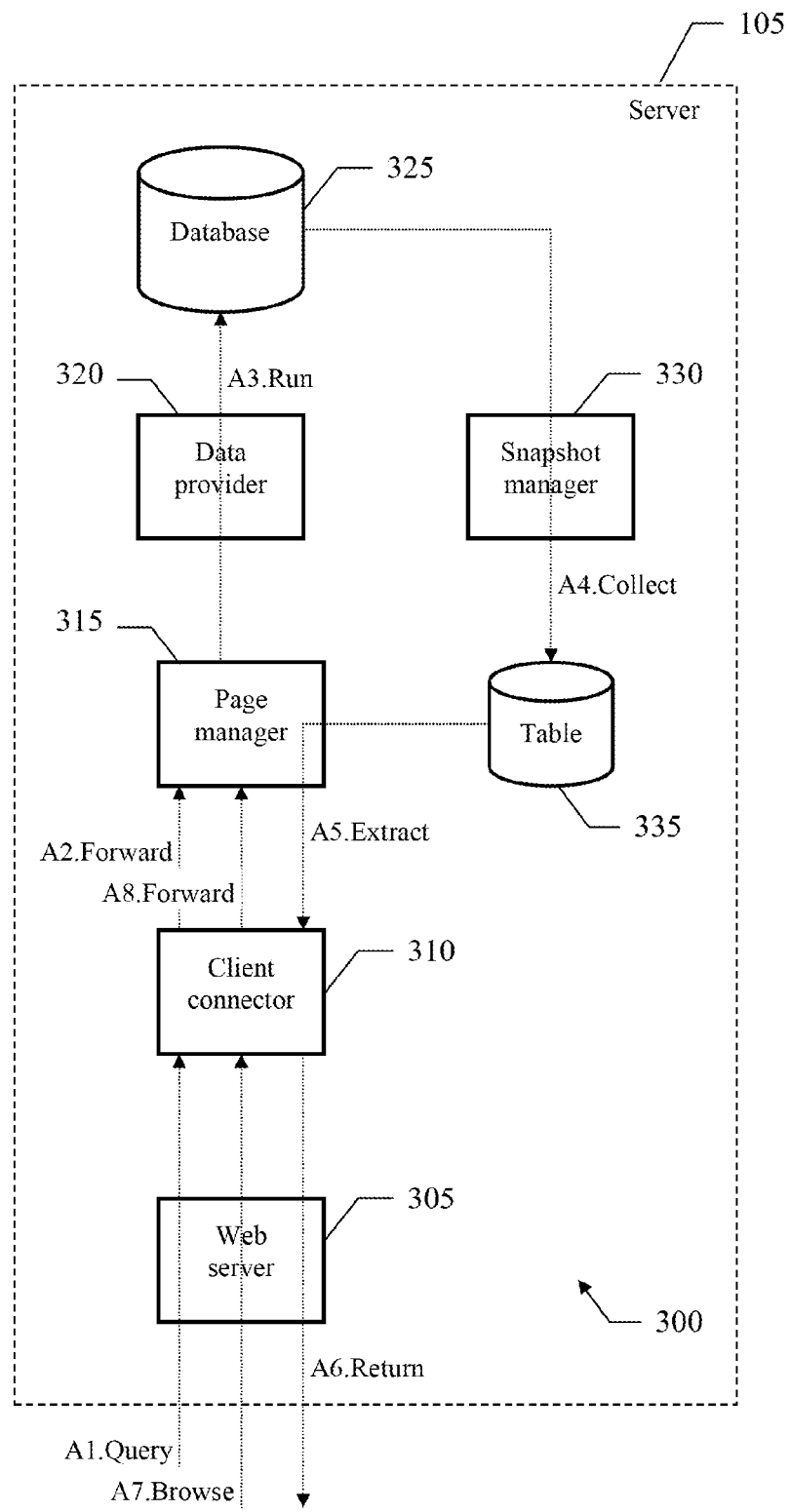
FIG. 3 shows a collaboration diagram representing the roles of software modules implementing the solution according to an embodiment of the invention.

Considering now FIG. 3, the main software modules that run on the server 105 are denoted as a whole with the reference 300. The information (programs and data) is typically stored on the hard-disk and loaded (at least partially) into the working memory of the server when the programs are running. The programs are initially installed onto the hard disk, for example, from CD-ROM. Particularly, the figure describes the static structure of the system (by means of the corresponding modules) and its dynamic behavior (by means of a series of exchanged messages, each one representing a corresponding action denoted with sequence numbers preceded by the symbol "A").

Particularly, a web server 305 executes commands submitted by each client (not shown in the figure) and delivers corresponding web pages—each one consisting of a hypertext document formatted in the HTML language. The user of a generic client submits a desired query to the web server 305 through a corresponding browser (action "A1.Query").

The web server 305 passes the query to a relevant web application. More specifically, the query is received by a client connector 310; the client connector 310 represents the outer layer of the web application, which exposes a corresponding API for the submission of queries and the retrieval of the desired results. The client connector 310 forwards the query to a page manager 315 (implementing the core of the web application).

In response thereto, the page manager 310 triggers the running of the query (action "A3.Run"). For this purpose, the page manager 310 interacts with a data provider 320, which controls a database 325 storing the whole information available to the web application; as pointed out above, the database 325 does not allow accessing its records selected by the query directly. A snapshot manager 330 is responsible to collect the selected records (resulting from the running of the query) from the database 325 into a table 335 (action "A4.Collect"); conversely, the table 335 provides a direct access to the selected records (such as at page level).

In a completely asynchronous way, as soon as a block of the selected records fitting a first page is available in the table 335, the page manager 315 extracts and passes it to the client connector 310 (action "A5.Extract"). The client connector 310 completes the requested page with the block of selected records; the page is then returned to the client through the web server 305 for its display (action "A6.Return").

The user of the client can then submits a browsing command to the web server 305 for moving to a different page of the selected records (action "A7.Browse"). As above, the web server 305 passes the command to the client connector 310 (Action "A8.Forward"). In this case, however, the page manager 315 directly extracts the corresponding block of records from the table 335—as soon as available—and passes it to the client connector 310 (same action "A5.Extract"), which completes the requested page and returns it to the client through the web server 305 for its display (same action "A6.Return").

Figure 4:
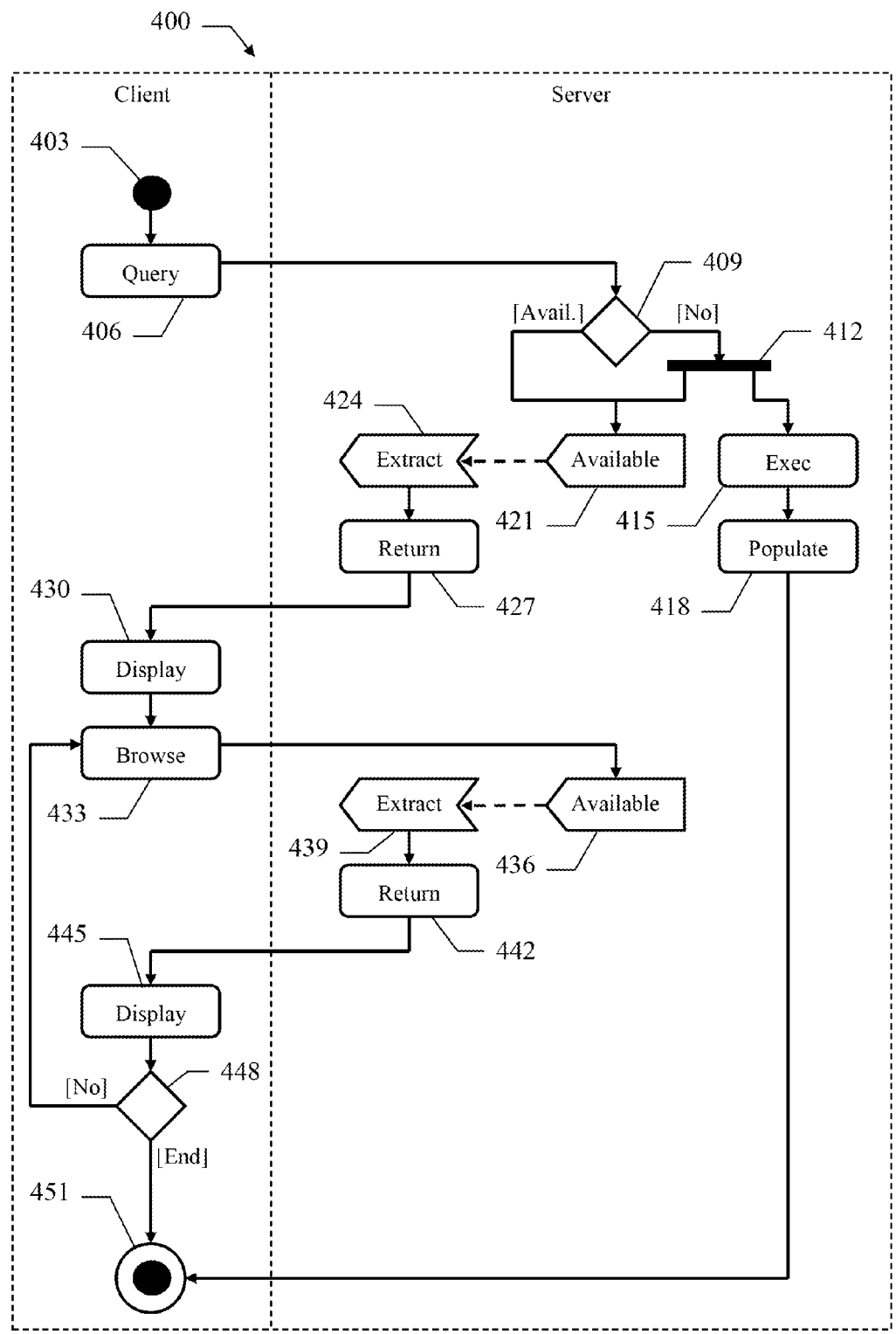
FIG. 4 is a diagram describing the flow of activities relating to an implementation of the solution according to an embodiment of the invention.

Passing to FIG. 4, the logic flow of an exemplary process that can be implemented in the above-described system to download the result of a desired query is represented with a method 400.

The method begins at the start block 403 in the swim-lane of the client. Passing to block 406, the user of the client submits a desired query to the server.

In response thereto, the server verifies at block 409 whether the table for storing the result of the query is already available. This happens when the table was created in response to a previous submission of the same query (and it was not deleted meanwhile) from either the same client or a different one; it should be noted that the table may be already populated with all the selected records or the process may still be in progress (when the two submissions of the query are in short succession).

If not, the process forks at the synchronization bar 412 into two branches that are executed concurrently. A first branch consists of blocks 415-418, and a second branch consists of blocks 421-448; the two branches joint at the concentric white/block stop circles 451.

Considering now block 415, the running of the query is started. Continuing to block 418, the selected records (resulting from the running of the query) are collected from the (non-direct-access) database into the (direct-access) table, so as to populate it in succession. Once the running of the query has been completed (with all the selected records stored in the table), the branch ends at the stop circles 451.

At the same time, the other branch is in a waiting condition at block 421; the same point is also reached directly from block 409 when the table for the result of the query is already available. In this way, the same structure may be advantageously exploited for different clients (submitting the same query). As soon as the first page of the selected records is available in the table, the flow of activity passes from block 421 to block 424; the first page is then extracted from the table. Proceeding to block 427, the first page is returned from the server to the client. As soon as the first page is received by the client (block 430) it is displayed on its monitor.

Later on, when the user needs to move to a different page s/he submits a corresponding browsing command to the server at block 433. In response thereto, as soon as the selected page is available in the table (block 436) the flow of activity passes to block 439 wherein the selected page is extracted from the table. Proceeding to block 442, the selected page is returned from the server to the client. As above, once the selected page is received by the client (block 445) it is displayed on its monitor.

The flow of activity then branches at decision block 448. If the user desires to move to another page, the method returns to block 433 to repeat the same operations described above. Conversely, the branch ends at the stop circles 451.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply if the system has a different structure or includes equivalent servers and/or clients. In any case, the proposed solution lends itself to be applied to download whatever kind of information, which is adapted to be logically organized in blocks of any size (such as pages of documents, sections of reports, and the like); in any case, the information must be available in a form wherein the blocks are not accessible directly (such as on a tape). Conversely, the selected information is copied into any other structure allowing accessing its blocks directly; this includes memory structures of the direct-access type in strict terms, but even different memory structures wherein the time required to access any block is far lower than the one required to retrieve it from the original source (for example, a sequential file for a tape). In addition, nothing prevents specifying a different first page together with the request (so as to return it to the client as soon as available).

Although the proposed solution is particularly advantageous when the source structure (i.e., the database) and the auxiliary structure (i.e., the table) are both stored on the server, since the time required to collect the selected information is minimized, any other architecture is within the scope of the invention. For example, the information may be available on a back-end computer, or the table may be created on a dedicated computer; in any case, it is emphasized that the transfer speed for collecting the selected information from the source structure to the auxiliary structure should be lower than the transfer speed for downloading the selected information from the auxiliary structure to the client (for example, because the first two entities are closer than the second ones are, and/or because the connection between the first two entities is faster than the connection between the second ones is).

Likewise, the same advantages are more evident when the selected information is transmitted from the server to the client through telephone cables, wireless connections, mobile infrastructures, or more generally any other telecommunication channels (wherein the corresponding transmission speeds are relatively low); however, nothing prevents applying the proposed solution in a local area network, on in any other data processing system (even for downloading information on a central unit of a computer from its peripheral units).

As above, the whole selected information is copied entirely from the source structure (i.e., the database) into the auxiliary structure (i.e., the table)—so that every page thereof is immediately available when it is necessary; however, nothing prevents limiting the collection only to a part of the selected information (for example, a chapter of a very large document).

As described above, the solution according to an embodiment of the invention has been specifically designed for applications wherein the selected information is displayed on a monitor of the client. Alternatively, the same idea may be also applied when the selected information is printed, or processed in any other way on the client.

The use of different pages for the selected information is within the scope of the invention; for example, the blocks may fit dedicated frames of a window, or any other structure adapted to be displayed in succession on the monitor of the client.

The reference to the query on a database is merely illustrative, and it must not to be interpreted in a limitative manner. For example, the selected information may be collected from a dedicated application (such as a performance monitor), or from external sources (such as a metering device).

It should be noted that any other policy may be implemented for maintaining the auxiliary structures on the server for next requests (for example, automatically invalidating them after a predefined period); in any case, this feature is not strictly necessary and it may be omitted in alternative embodiments of the invention (wherein the auxiliary structure is always created from scratch for every request).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing device, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like.

In any case, the solution according to the present invention lends itself to be implemented with a hardware structure (for example, integrated in a chip of semiconductor material), or with a combination of software and hardware.

Even though in the preceding description reference has been made to a physical implementation of the proposed solution on the server, this is not to be intended as a limitation. Indeed, in a different embodiment of the invention the same solution may be deployed by means of a service, which is offered by a corresponding provider.

Alternatively, the proposed method may be implemented on a computer with a different architecture or that includes equivalent units (such as cache memories temporarily storing the programs or parts thereof to reduce the accesses to the mass memory during execution); more generally, it is possible to replace the computer with any code execution entity (such as a PDA, a mobile phone, and the like).

The invention claimed is:

1. A method for downloading information in a data processing system, the method including the steps of:
receiving, at a server entity of the system, a downloading request from a client entity of the system for downloading selected information including a plurality of logic blocks from a source structure, wherein the source structure is a database, wherein the source structure is accessible to the server entity, wherein the source structure does not allow accessing only a selected portion of the plurality of logic blocks of the selected information;
transferring the plurality of blocks of the selected information from the source structure into an auxiliary structure wherein any block in the plurality of blocks is directly accessible, the transferring including running a query on the database and inserting a result of the query into the auxiliary structure;
downloading a selected one of the blocks from the auxiliary structure to the client entity;
receiving a browsing command from the client entity for accessing a further selected one of the blocks; and
downloading the further selected block from the auxiliary structure to the client entity.

2. The method according to claim 1, wherein each step of downloading includes:
transmitting the selected block or the further selected block from the server entity to the client entity through a telecommunication channel.

3. The method according to claim 1, wherein the step of collecting the selected information includes:
copying the whole selected information from the source structure into the auxiliary structure.

4. The method according to claim 1, further including the step of:
causing the client entity to display each downloaded block individually.

5. The method according to claim 4, wherein the client entity is adapted to display pages in succession on a monitor, each downloaded block fitting a corresponding page.

6. The method according to claim 1, further including the steps of:
receiving another download request from another client entity of the system for downloading said selected information;
verifying the availability of the selected information in the auxiliary structure;
starting collecting the selected information from the source structure into the auxiliary structure in response to the non-availability; and
downloading another selected one of the blocks from the auxiliary structure to the other client entity.

7. A computer program in a computer readable storage medium for downloading information when the computer program is executed on a data processing system performing a method including the steps of:

receiving, at a server entity of the system, a downloading request from a client entity of the system for downloading selected information including a plurality of logic blocks from a source structure, wherein the source structure is a database, wherein the source structure is accessible to the server entity, wherein the source structure does not allow accessing only a selected portion of the plurality of logic blocks of the selected information;

transferring the plurality of blocks of the selected information from the source structure into an auxiliary structure wherein any block in the plurality of blocks is directly accessible, the transferring including running a query on the database and inserting a result of the query into the auxiliary structure;

downloading selected one of the blocks from the auxiliary structure to the client entity;

receiving a browsing command from the client entity for accessing a further selected one of the blocks; and downloading the further selected block from the auxiliary structure to the client entity.

8. A system for downloading information, the system including:

a storage device including a storage medium, wherein the storage device stores computer usable program code; and a processor, wherein the processor executes the computer usable program code, and wherein the computer usable program code comprises:

computer usable code for receiving, at a server entity of the system, a downloading request from a client entity of the system for downloading selected information including a plurality of logic blocks from a source structure, wherein the source structure is a database, wherein the source structure is accessible to the server entity, wherein the source structure does not allow accessing only a selected portion of the plurality of logic blocks of the selected information;

computer usable code for transferring the plurality of blocks of the selected information from the source structure into an auxiliary structure wherein any block in the plurality of blocks is directly accessible, the computer usable code for transferring including computer usable code for running a query on the database and computer usable code for inserting a result of the query into the auxiliary structure;

computer usable code for downloading a selected one of the blocks from the auxiliary structure to the client entity;

computer usable code for receiving a browsing command from the client entity for accessing a further selected one of the blocks; and computer usable code for downloading the further selected block from the auxiliary structure to the client entity.

9. The method of claim 1, wherein for extracting a logic block the selected information has to be extracted from the source structure in succession until the logic block is reached.

10. The method of claim 1, wherein a transfer speed for transferring the selected information from the source structure into the auxiliary structure is higher than a transfer speed for downloading the selected information from the auxiliary structure to the client entity.

11. The computer program according to claim 7, wherein each step of downloading includes:

transmitting the selected block or the further selected block from the server entity to the client entity through a telecommunication channel.

12. The computer program according to claim 7, wherein the step of collecting the selected information includes:

copying the whole selected information from the source structure into the auxiliary structure.

13. The computer program according to claim 7, further including the step of:

causing the client entity to display each downloaded block individually.

14. The computer program according to claim 13, wherein the client entity is adapted to display pages in succession on a monitor, each downloaded block fitting a corresponding page.

15. The computer program according to claim 7, further including the steps of:

receiving another download request from another client entity of the system for downloading said selected information;

verifying the availability of the selected information in the auxiliary structure;

starting collecting the selected information from the source structure into the auxiliary structure in response to the non-availability; and downloading another selected one of the blocks from the auxiliary structure to the other client entity.

* * * * *